United States Patent
Bird et al.

(10) Patent No.: US 7,007,016 B2
(45) Date of Patent: Feb. 28, 2006

(54) SUPPORT FOR CONCURRENT ACTIVE SQL STATEMENTS HAVING SHARED SQL CONTEXT INFORMATION

(75) Inventors: Paul M. Bird, Markham (CA); Timothy J. Vincent, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 10/317,229

(22) Filed: Dec. 11, 2002

(65) Prior Publication Data

US 2003/0120648 A1    Jun. 26, 2003

(30) Foreign Application Priority Data

Dec. 20, 2001  (CA) .................................. 2365731

(51) Int. Cl.
*G06F 17/30* (2006.01)
(52) U.S. Cl. .................. 707/4; 707/2; 707/3; 707/100; 707/102
(58) Field of Classification Search .................. 707/2, 707/4, 100, 3, 102
See application file for complete search history.

(56) References Cited

U.S. PATENT DOCUMENTS

| 4,025,904 A | 5/1977 | Adney et al. ............ 340/172.5 |
| 4,067,058 A | 1/1978 | Brandstaetter et al. ...... 364/200 |
| 4,382,278 A | 5/1983 | Appelt ........................ 364/200 |
| 5,713,018 A | 1/1998 | Chan .......................... 395/610 |
| 5,897,634 A | 4/1999 | Attaluri et al. ................ 707/8 |
| 5,897,649 A | 4/1999 | Kennedy ..................... 707/538 |
| 6,023,696 A | 2/2000 | Osborn et al. ................ 707/3 |
| 6,269,369 B1 * | 7/2001 | Robertson ..................... 707/10 |
| 6,353,833 B1 * | 3/2002 | Bird et al. ................... 707/201 |
| 6,418,448 B1 * | 7/2002 | Sarkar ...................... 707/104.1 |
| 6,529,915 B1 * | 3/2003 | Owens et al. ........... 707/103 R |

* cited by examiner

*Primary Examiner*—Cam-Y Truong
(74) *Attorney, Agent, or Firm*—John L. Rogitz

(57) ABSTRACT

An SQL database management system for executing SQL requests from applications. The SQL database management system includes a hierarchical arrangement of data structures comprising packages, section entries, sibling control blocks and sections, for representing SQL context information and SQL statement information. Each package represents SQL context information on an application component-level basis. Each section entry is associated with a package and corresponds to a set of SQL actions. Each section entry is potentially associated with one or more sibling control blocks. Each sibling control block is associated with one section and represents context information relating to a unique SQL request. Each section includes logic for a specific SQL statement.

11 Claims, 1 Drawing Sheet

SUPPORT FOR CONCURRENT ACTIVE SQL STATEMENTS HAVING SHARED SQL CONTEXT INFORMATION

FIELD OF THE INVENTION

This invention generally relates to computing systems and in particular to relational database management systems that support concurrent active SQL statements having shared SQL context information.

BACKGROUND OF THE INVENTION

Relational database management systems (RDBMSs) provide applications with access to stored database tables. Applications typically include, or reference, SQL statement text in requests sent from the application to the database system. Usually, a database system generates and maintains internal representations reflecting requests made to it by applications. These internal representations include both representations of SQL statements and SQL context information. The former are representations maintained by the database system corresponding to SQL statements referenced by requests to the database system. The latter are internal representations of the application contexts from which requests are made to the database system and contain information from those contexts such as the type of SQL statement and application cursor name. The efficiency of database access is dependent in part on the RDBMS architecture selected for the storage of, and access to, such executable statement representations and SQL context information.

One approach in database system design is to collect SQL statement and context information from an application by the introduction of a pre-processing stage in the compilation of the application source code to extract this type of information. A binding stage follows in which this SQL information is transferred into the RDBMS for future reference during the application's execution. During these steps, SQL text in an application is replaced with calls to RDBMS-supplied client routines. These routines are invoked at runtime and issue requests to the RDBMS. During the pre-processing and bind stages, SQL information is defined in the database system that is intended to reflect the application context from which application requests to the database will be issued. This information potentially includes SQL statement representations and SQL context information.

In some database management systems, SQL statements may call user-defined routines such as stored procedures and functions which may, in turn, include SQL statements. Such routines may call other routines or may make recursive calls. In such systems, during the execution of SQL statements, the statements may themselves invoke other SQL statements. If the same SQL routine is recursively invoked by an SQL statement, there may appear to be multiple SQL requests, each associated with the same request context, and each active at the same time within the application.

Such multiple requests may be handled by the RDBMS creating new SQL context data for each new request. However, the requests each share an association with the original SQL context data of the original application request. Because the requests from the user-defined routines are being executed under the scope of the original application request, the generation and management of multiple sets of SQL context data is a potential inefficiency in the RDBMS.

SUMMARY OF THE INVENTION

According to an aspect of the present invention there is provided a relational database management system that efficiently supports concurrent active SQL statements sharing SQL context information.

According to another aspect of the present invention there is provided an SQL database management system for executing SQL requests from applications, including representation means for representing SQL context information and SQL statement information, the representation means including means for defining and utilizing a hierarchical arrangement of data structures including packages, section entries, sibling control blocks and sections, each package representing SQL context information on an application component-level basis, each section entry being associated with one of the packages and corresponding to a set of SQL actions and potentially being associated with one or more sibling control blocks, each sibling control block being associated with one section and representing context information relating to a unique SQL request, and each section including logic for a specific SQL statement.

According to another aspect of the present invention there is provided the above system in which the invocation of nested user-defined routines is supported and in which each sibling control block is associated with a nesting level within the user-defined routines.

According to another aspect of the present invention there is provided the above system in which each sibling control block includes an identifier to uniquely identify the sibling control block within a set of sibling control blocks associated with a selected nesting level.

According to another aspect of the present invention there is provided a computer program product for use in an SQL database management system for executing SQL requests from applications, the computer program product including a computer usable medium having computer readable code means embodied in said medium for implementing a representation of SQL context information and SQL statement information, including computer readable program code means for defining and utilizing a hierarchical arrangement of data structures including packages, section entries, sibling control blocks and sections, each package representing SQL context information on an application component-level basis, each section entry being associated with one of the packages and corresponding to a set of SQL actions and potentially being associated with one or more sibling control blocks, each sibling control block being associated with one section and representing context information relating to a unique SQL request, and each section including logic for a specific SQL statement.

According to another aspect of the present invention there is provided the above program product in which SQL database management system supports the invocation of nested user-defined routines and in which each sibling control block is associated with a nesting level within the user-defined routines.

According to another aspect of the present invention there is provided the above program product in which each sibling control block includes an identifier to uniquely identify the sibling control block within a set of sibling control blocks associated with a selected nesting level.

According to another aspect of the present invention there is provided a method for representing SQL context information and SQL statement information in an SQL database management system for executing SQL requests from applications, the database management system including means for defining and utilizing a hierarchical arrangement of data structures including packages, section entries, sibling control blocks and sections, the method including the steps of defining a first package to representing SQL context information for an application, defining a set of section entries and associating those section entries with the first package, each section entry in the set corresponding to a set of SQL actions in the application, defining one or more sibling control blocks, each sibling control block being associated with one section entry and being defined to represent context information relating to a unique SQL request, and defining one or more sections, each section to be associated with one sibling control block and including logic for a specific SQL statement.

According to another aspect of the present invention there is provided the above method in which SQL database management system supports the invocation of nested user-defined routines and in which the step of defining one or more sibling control blocks includes the further step of associating each sibling control block with a nesting level value corresponding to the nesting level of a user-defined routine associated with the sibling control block.

According to another aspect of the present invention there is provided the above method in which the step of defining one or more sibling control blocks includes the further step of associating each sibling control block with an identifier to uniquely identify the sibling control block within a set of sibling control blocks associated with a selected nesting level.

BRIEF DESCRIPTION OF THE DRAWINGS

In the accompanying drawing which illustrates the invention by way of example only.

Figure 1:
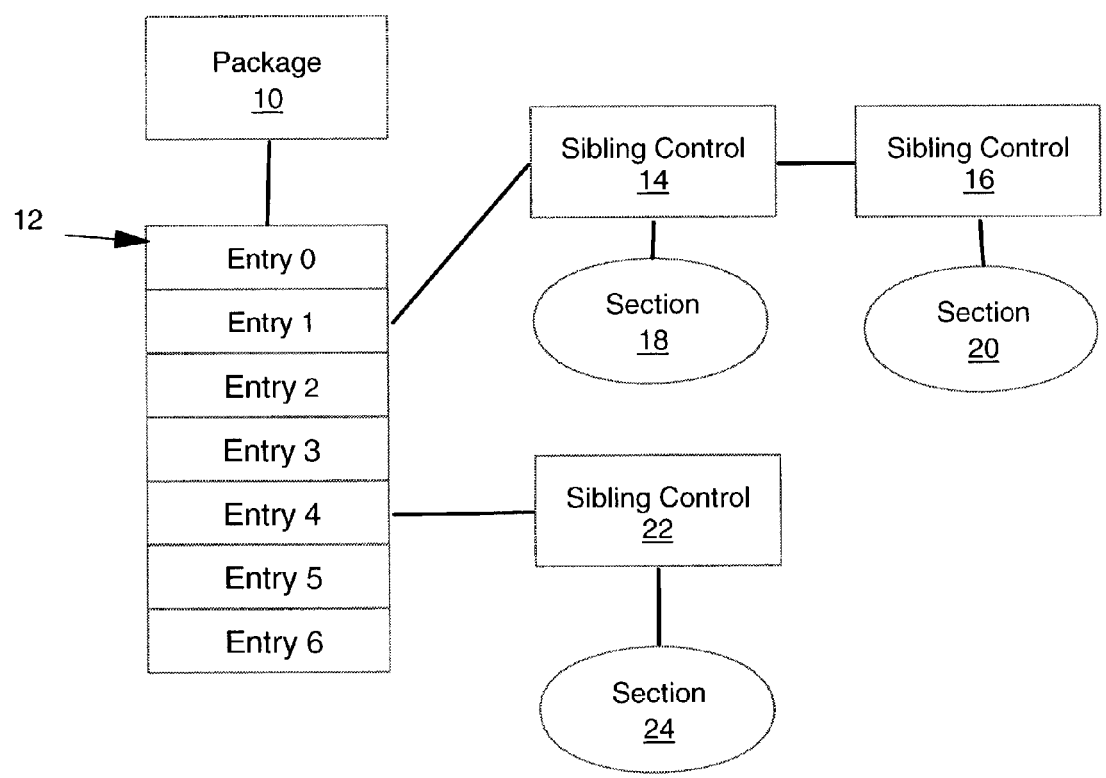
FIG. 1 is a block diagram showing an example arrangement of data representing potentially concurrent SQL statement information and SQL context information according to the preferred embodiment.

In the drawing, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

The preferred embodiment of the current invention provides for the representation of SQL statements and SQL context information in a structure shown by example in the block diagram of FIG. 1. The preferred embodiment is described with reference to the structure of statement representations and SQL context information organization and storage used in the DB2 UDB™ RDBMS. It will be understood by those skilled in the art that the details of the DB2 UDB™ system need not be utilized to achieve the benefit of the invention.

The system of the preferred embodiment uses data organized as packages, section entries, sibling control blocks and sections, to represent SQL context information and SQL statements in the database system. Package and section entry information is generated during a pre-processing step in which SQL information, such as an SQL action (e.g. PREPARE or EXECUTE) or an actual SQL statement itself, are removed from the application source code and replaced by function calls to RDBMS-provided client functions. At runtime, these functions are called when execution of an application reaches the original location of the SQL statement or action in the original application source code and an SQL request is sent to the RDBMS.

While an application is executing, it sends SQL requests to the database system via the RDBMS-provided client functions embedded within the application executable during the pre-processing stage. Each request sent from the application identifies the application context from which the request was issued by identifying the package and section entry representing the request, or SQL, context. Similarly, a user-defined routine called by the application, which routine itself contains SQL statements, issues requests to the database. These also use the same SQL context identification mechanism as the application from which the routine was called. The RDBMS uses this SQL context identification to find the relevant information in its internal representations so that it can reflect the appropriate context of the SQL request and the behaviour desired by the application.

In the preferred embodiment, a package is a data structure that represents the explicit result of the pre-processing step as applied to one application component (source code file). It includes such information as the default compilation environment for any SQL statements associated with that package. Examples of the compilation environment information are the query optimization level to be used during statement compilation and the degree of parallelism to be considered. The package information also potentially affects the execution of any SQL statements referenced by the package. Such information as the degree of row blocking to be used for eligible cursors is maintained in the appropriate package and is usable during execution.

Section entries are data structures that are associated with a specific package. There exists a unique section entry for each set of related SQL actions within the original application. Related SQL actions are actions that are defined with reference to the same SQL statement in the application. In the preferred embodiment, a section entry contains SQL context information that relates specifically to the SQL statement upon which actions are to be taken. This information includes whether the SQL statement is dynamic or static in nature and the specified cursor name, if relevant, used to refer to the SQL statement by the application.

A section is an executable object that contains the logic needed to represent a specific SQL statement to the RDBMS. In the preferred embodiment, an SQL statement is "prepared" and the process of preparation generates the statement's corresponding section. This preparation process is also referred to as the compilation, or optimization, of the statement (in the preferred embodiment, an SQL statement). For static SQL statements, the section for the statement may be prepared at the pre-processing step. For dynamic SQL, the section is not generated until application runtime.

As the above indicates, the SQL context for a request made by the application to the RDBMS is specified, at least in part, by the SQL information associated with the package data and by the section entry information that is related to the request. Each request from the application contains data associating the request with a specified package and section entry.

The architecture of the preferred embodiment provides for section representations and SQL context information to be generated and stored to support user-defined stored routines which may, in turn, include SQL statements and which routines may call other routines or may make recursive calls. In such an RDBMS the same SQL statement may be executed in different usage or nesting layers in an application program. When a routine is executed it has a nesting layer identifier associated with it that is based on how many layers of nested invocations of routines have directly preceded the routine's invocation. In other words, when a routine is invoked it has an incremented nesting layer identifier, relative to that of the invoking routine.

The preferred embodiment allows two or more requests from the same application to be processed at the same time even when they have the same context identifying information. The preferred embodiment distinguishes between these requests by identifying the appropriate context information to be used for each individual request from the nesting layers at which the requests were issued by the application.

In the preferred embodiment, the SQL context information is arranged to permit the efficient representation of concurrent active SQL statements. An example of the preferred embodiment representation is shown in the block diagram of FIG. 1. Package 10 is shown with section entries located in section directory 12. In the example of FIG. 1, there are seven different section entries shown associated with package 10. These are section entries 0 through 6, inclusive in section directory 12. In the example of FIG. 1, section entry 1 is shown having associated sibling control blocks 14, 16. Sibling control block 14 has associated section 18 and sibling control block 16 has associated section 20. Similarly, section entry 4 in section directory 12 is associated with sibling control block 22 which is, in turn, associated with section 24.

Each request processed by the RDBMS of the preferred embodiment is associated with a specific package, section entry and sibling control block. For example, an application request may specify package 10, section entry 4. Since the application is, by definition, given nesting level 0, sibling control block (with a nesting level 0) is selected. The only sibling control block associated with section entry 4 in section directory 12 is sibling control block 22. The section associated with section entry 4 in section directory 12 is therefore identified as section 24 in the example of FIG. 1. This section will therefore be executed in response to a request that specifies package 10, section entry 4.

The sibling control block represents a unique occurrence of an SQL request within the application's execution and each sibling control block is uniquely identified from others underneath the same section entry by the nesting level at which it is being used as well as by a unique identifier defined within the nesting level. This nesting level information is maintained by the RDBMS and indicates the level of nesting or recursion at which the request is received by the RDBMS.

The sibling control block contains control and state information relevant for the request it represents and is independent of other sibling control blocks under the same section entry (in the example of FIG. 1, sibling control blocks 14, 16 are independent of each other). By isolating the control and state information of each request in the sibling control block, only one copy of the package and section entry information needs to be maintained by the RDBMS while the application is running. Multiple requests referring to the same SQL context, that is the same package and section entry combination, will not generate a conflict in the system of the preferred embodiment since the specific execution information for the requests is not in package or section entry information but is in individual sibling control blocks.

Where, for example, section 20 and sibling control block 16 are loaded in the working memory of the RDBMS, a request specifying package 10, section entry 1, will cause the database system to use the usage layer of the request to identify and access sibling control block 16 and hence section 20. There is no conflict in identifying the correct sibling control block to access as the nesting layer of the request is used to distinguish the sibling control blocks. Where such a request is made and these objects are not in the working memory, the working copies of the objects will be generated by the RDBMS and will be added to the working memory as shown in FIG. 1.

Sibling control blocks are also identifiable by an identifier that uniquely identifies the sibling control blocks within a given nesting level. This identifier permits two or more identical SQL statements to be executed in parallel at the same nesting level and to have the same request context.

As indicated above, in the preferred embodiment, the package and section entry define certain aspects of the request context but, in addition, request context information is maintained in the sibling control blocks. The initial response to the request made returns the unique identifier used as part of the sibling control block identifier and subsequent requests to the same sibling control block must pass the unique identifier to permit the same sibling control block to be accessed. The request context information that is modifiable at application runtime is stored in the sibling control blocks. Request context information which is not modifiable is maintained in the package information or section entry information.

This permits concurrently active SQL statements to be referenced using the same SQL context information as provided by the package and section entry data, but to have differing request control information, as provided by the sibling control blocks. In the preferred embodiment, the sibling control block maintains information relating to the state of the section, any dynamic SQL statement information and those other attributes of the section entry that are modifiable (for example, cursor attributes).

The separation between SQL context information stored for the package and section entry on the one hand, and request control information stored in the sibling control block on the other, is desirable to permit:

1. for dynamic SQL statements, different statements (and thus different sections) to be associated with the same SQL context by different usage layers;
2. for dynamic SQL cursors, different cursor attributes to be used for the same SQL context by different layers; and
3. each section associated with a section entry, whether dynamic or static, to be in a different state of execution at the same time.

The representation of statements and their related SQL context information as defined in the preferred embodiment provides for a relatively simple organization of the application SQL context by maintaining those aspects that differentiate between individual requests in the appropriate sibling control blocks. Certain request control information is stored at the package and section entry levels and this permits efficiencies to be realized by avoiding the duplication of this SQL context information for concurrently active SQL statements.

Although a preferred embodiment of the invention has been described above, it will be appreciated by those skilled in the art that variations may be made, without departing from the spirit of the invention or the scope of the appended claims.

The embodiments of the invention in which an exclusive right or privilege is claimed are described as follows:

1. A database management system for executing query language requests from applications, comprising representation means for representing query context information and statement information of a query language, the representation means comprising means for defining and utilizing a hierarchical arrangement of data structures comprising packages, section entries, sibling control blocks and sections, each package representing query language context information on an application component-level basis, each section entry being associated with one of the packages and corresponding to a set of structured query language (SQL) actions and being associated with one or more sibling control blocks, each sibling control block being associated with one section and representing context information relating to a unique query language request, and each section comprising logic for a specific query statement, a sibling control block representing a unique occurrence of a structured query language (SQL) request within the application's execution and each sibling control block being uniquely identified from other sibling control blocks at least under the same section entry;

wherein control and state information of a request are established in a sibling control block such that multiple requests referring to the same structured query language (SQL) context do not generate a conflict.

2. The system of claim 1 in which the invocation of nested user-defined routines is supported and in which each sibling control block is associated with a nesting level within the user-defined routines.

3. The system of claim 2 in which each sibling control block comprises an identifier to uniquely identify the sibling control block within a set of sibling control blocks associated with a selected nesting level.

4. A computer program product for use in a database management system for executing requests from applications, the computer program product comprising a computer usable medium having computer readable code means embodied in said medium for implementing a representation of query context information and query statement information, comprising computer readable program code means for defining and utilizing a hierarchical arrangement of data structures comprising packages, section entries, sibling control blocks and sections, each package representing context information on an application component-level basis, each section entry being associated with one of the packages and corresponding to a set of structured query language (SQL) query actions and being associated with one or more sibling control blocks, each sibling control block being associated with one section and representing context information relating to a unique query request, and each section comprising logic for a specific query statement, wherein: a sibling control block contains control and state information relevant for the request the sibling control block represents and is independent of other sibling control blocks associated with the same section, wherein control and state information of a request are established in a sibling control block such that multiple requests referring to the same structured query language (SQL) context do not generate a conflict.

5. The program product of claim 4 in which the database management system supports the invocation of nested user-defined routines and in which each sibling control block is associated with a nesting level within the user-defined routines.

6. The program product of claim 5 in which each sibling control block comprises an identifier to uniquely identify the sibling control block within a set of sibling control blocks associated with a selected nesting level.

7. The program product of claim 4, in which SQL is a query language used.

8. A method for representing query context information and query statement information in a database management system for executing query requests from applications, the database management system comprising means for defining and utilizing a hierarchical arrangement of data structures comprising packages, section entries, sibling control blocks and sections, the method comprising:

a. defining a first package to represent query context information for an application, b. defining a set of section entries and associating those section entries with the first package, each section entry in the set corresponding to a set of structured query language (SQL) query actions in the application, c. defining one or more sibling control blocks, each sibling control block being associated with one section entry and being defined to represent context information relating to a unique query request, and d. defining one or more sections, each section to be associated with one sibling control block and comprising logic for a specific query statement, wherein maintaining context information in the sibling control blocks facilitates concurrently active structured query language (SQL) statements being referenced using the same context information as provided by package and section entry data, and to have differing request control information, as provided by the sibling control blocks;

wherein control and state information of a request are established in a sibling control block such that multiple requests referring to the same structured query language (SQL) context do not generate a conflict.

9. The method of claim 8 in which the database management system supports the invocation of nested user-defined routines and, in which the step of defining one or more sibling control blocks comprises the further step of associating each sibling control block with a nesting level value corresponding to the nesting level of a user-defined routine associated with the sibling control block.

10. The method of claim 9 wherein the act of defining one or more sibling control blocks comprises associating each sibling control block with an identifier to uniquely identity the sibling control block within a set of sibling control blocks associated with a selected nesting level.

11. The method of claim 8 in which SQL is a query language used.

* * * * *